United States Patent
Echizen et al.

(10) Patent No.: US 8,404,119 B2
(45) Date of Patent: Mar. 26, 2013

(54) METHOD OF MEMBRANE SEPARATION AND MEMBRANE SEPARATION APPARATUS

(75) Inventors: Masashi Echizen, Ibaraki (JP); Takuji Shintani, Ibaraki (JP); Naoki Kurata, Ibaraki (JP); Kouji Maruyama, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 118 days.

(21) Appl. No.: 12/595,083

(22) PCT Filed: Apr. 4, 2008

(86) PCT No.: PCT/JP2008/056748
§ 371 (c)(1),
(2), (4) Date: Oct. 8, 2009

(87) PCT Pub. No.: WO2008/126777
PCT Pub. Date: Oct. 23, 2008

(65) Prior Publication Data
US 2010/0126935 A1  May 27, 2010

(30) Foreign Application Priority Data
Apr. 9, 2007 (JP) .................................. 2007-101407

(51) Int. Cl.
*B01D 61/00* (2006.01)
*B01D 35/00* (2006.01)
*B01D 63/00* (2006.01)

(52) U.S. Cl. ......... 210/652; 210/85; 210/321.6; 210/94; 210/95; 210/96.2

(58) Field of Classification Search .............. 210/321.6, 210/321.75, 321.84, 85, 87, 94, 95, 650–652, 210/96.2
See application file for complete search history.

(56) References Cited

U.S. PATENT DOCUMENTS
(Continued)

FOREIGN PATENT DOCUMENTS
JP  59-083036   5/1984
JP  8-309350   11/1996
(Continued)

OTHER PUBLICATIONS
International Search Report issued on the corresponding PCT Application No. PCT/JP2008/056748, dated May 1, 2008.
(Continued)

*Primary Examiner* — Ana Fortuna
(74) *Attorney, Agent, or Firm* — Knobbe Martens Olson & Bear, LLP

(57) ABSTRACT

A method of membrane separation and membrane separation apparatus, with which not only a supply liquid can be evaluated but also the problems, such as scale, occurring on reverse osmosis membrane can be monitored in a highly straightforward fashion. There is provided a membrane separation apparatus equipped with reverse osmosis membrane module (3) so as to be adapted for feeding of a supply liquid and obtaining of a permeated liquid and a concentrated liquid, characterized by comprising a feeding-side membrane separation means (10) which includes a separation membrane (11) of which the membrane face (11*a*) can be monitored and guides the supply liquid so as to separate the membrane, and a concentrating-side membrane separation means (20) which includes a separation membrane (21) of which the membrane face (21*a*) can be monitored and guides the concentrated liquid so as to separate the membrane separation thereof.

6 Claims, 1 Drawing Sheet

U.S. PATENT DOCUMENTS

| | | | |
|---|---|---|---|
| 4,110,220 A * | 8/1978 | Lavender | 210/321.75 |
| 4,906,260 A * | 3/1990 | Emheiser et al. | 95/279 |
| 5,174,901 A * | 12/1992 | Smith | 210/652 |
| 6,017,459 A * | 1/2000 | Zeiher et al. | 210/650 |
| 6,730,227 B2 * | 5/2004 | Zeiher et al. | 210/650 |
| 7,186,331 B2 * | 3/2007 | Maartens et al. | 210/90 |
| 7,867,214 B2 * | 1/2011 | Childers et al. | 604/411 |
| 7,910,004 B2 * | 3/2011 | Cohen et al. | 210/652 |

FOREIGN PATENT DOCUMENTS

| | | |
|---|---|---|
| JP | 9-290275 | 11/1997 |
| JP | 10-286445 | 10/1998 |
| JP | 2001-269544 | 10/2001 |
| JP | 2003-340245 | 12/2003 |
| JP | 2004-188387 | 7/2004 |
| JP | 2005-106516 | 4/2005 |

OTHER PUBLICATIONS

Notice of Preliminary Rejection issued by Korean Intellectual Property Office on Oct. 31, 2011 in the corresponding Korean patent application No. 10-2009-7023283.

J.S. Vrouwenvelder et al., "The Membrane Fouling Simulator: A practical tool for fouling prediction and control," Journal of Membrane Science vol. 281, pp. 316-324, 2006.

Notice of Rejection Decision dated Jul. 31, 2012 in corresponding Korean patent application No. 10-2009-7023283.

* cited by examiner

METHOD OF MEMBRANE SEPARATION AND MEMBRANE SEPARATION APPARATUS

This application is the U.S. National Phase under 35 U.S.C. §371 of International Application No. PCT/JP2008/056748, filed Apr. 4, 2008, which claims priority to the Japanese Patent Application No. 2007-101407, filed Apr. 9, 2007. The International Application was not published in English under PCT Article 21(2).

TECHNICAL FIELD

The present invention relates to a membrane separation method and a membrane separation apparatus that can monitor both a supply liquid and a concentrated liquid of a reverse osmosis membrane module.

BACKGROUND ART

A separation technique using a reverse osmosis membrane is widely used for production of plain water by desalination of brine, seawater, or the like, production of ultrapure water, or the like. However, in accordance with continuance of the process, the permeation flux of the reverse osmosis membrane decreases, whereby the operation pressure rises. In this case, in order to restore the membrane performance, a process of stopping the operation and cleaning the reverse osmosis membrane will be needed.

Conventionally, in the case of performing water processing by using a reverse osmosis membrane, in order to reduce the frequency of such membrane cleaning to enhance the processing efficiency, a method is carried out in which the supply water to the reverse osmosis membrane apparatus is evaluated by various methods, and a pre-processing is carried out in accordance with the needs so that this value will be less than or equal to a predefined value so as to make the reverse osmosis membrane supply water be clean to some extent, whereby obstacles such as decrease in the permeation flux or rise in the operation pressure in the reverse osmosis membrane apparatus are avoided so as to continue a safe operation.

For such an evaluation, there is known a fouling index (FI) defined in JIS K3802 or a silt density index (SDI) defined in ASTM D4189 or, as a more convenient evaluation method, an MF value proposed by Taniguchi (Desalination, vol. 20, pp. 353-364, 1977).

These FI value, SDI value, and MF value are all calculated based on a measurement value obtained by measuring a predetermined filtration time when reverse osmosis membrane supply water is filtered with use of a precision filtration membrane having a pore diameter of 0.45 μm. In the following patent document 1, a reverse osmosis membrane apparatus is disclosed in which operation management is carried out based on an evaluation result obtained by evaluating whether the water supplied to the reverse osmosis membrane apparatus is good or not with use of such a precision filtration membrane.

However, with this reverse osmosis membrane apparatus, through operation management is carried out by evaluation of the supply water, when a problem such as scale is actually generated in the reverse osmosis membrane by some cause, this cannot be evaluated by the precision filtration membrane of the supply water.

Also, the following patent document 2 discloses a membrane separation apparatus in which a submodule is provided in parallel with a main module, and an operation state of the submodule is monitored while performing reverse osmosis membrane separation under the same condition by feeding the same supply water. Then, it discloses that, as a submodule, the membrane surface has a small area; the permeation flux is monitored; and the effective difference pressure is monitored.

However, when a problem such as scale is generated, for example, in this membrane separation apparatus, in order to detect this with certainty, a devise in the structure will be needed such as providing a structure in which the concentration polarization in the supply-side flow path is less liable to be generated in the submodule than in the main module, thereby raising a problem in that the certainty and specificity of detection are low.

Patent document 1: Japanese Unexamined Patent Publication No. 2004-188387

Patent document 2; Japanese Unexamined Patent Publication No. 10-286445

DISCLOSURE OF THE INVENTION

Problems to be Solved by the Invention

Therefore, an object of the present invention is to provide a membrane separation method and a membrane separation apparatus that can evaluate the supply liquid and can monitor in a more straightforward fashion the problems such as scale generated in the reverse osmosis membrane.

Means for Solving the Problems

The above object can be achieved by the present invention such as described below.

A membrane separation method of the present invention relates to a membrane separation method of feeding a supply liquid to a reverse osmosis membrane module and obtaining a permeated liquid and a concentrated liquid, characterized in that membrane separation is carried out by guiding the supply liquid to a supply-side separation membrane whose membrane surface can be monitored, and membrane separation is carried out by guiding the concentrated liquid to a concentration-side separation membrane whose membrane surface can be monitored.

According to the membrane separation method of the present invention, not only the supply-side separation membrane but also the concentration-side separation membrane for performing membrane separation by guiding the concentrated liquid are provided, and these have membrane surfaces that can be monitored, so that the supply liquid can be evaluated, and the problems such as scale generated in the reverse osmosis membrane can be monitored in a more straightforward fashion. In other words, the evaluation of the supply liquid can be made by performing direct eye inspection for determination of mingling of foreign substances or the like with use of the supply-side separation membrane, and organic substances, inorganic substances, bacteria, and the like can be monitored by addition of a dyeing agent or the like. Also, as to the scale or the like, deposition onto the membrane surface of the concentration-side separation membrane can be directly monitored by eye inspection.

It is preferable that the concentration-side separation membrane is a plain membrane having an average pore diameter of 1 μm or less, and a supply-side flow path of the plain membrane is made of a transparent material. With use of a plain membrane having such an average pore diameter, the generated scale can be captured on the membrane surface, and the scale and the like can be monitored more easily by eye inspection or image analysis via the transparent material of the supply-side flow path.

It is preferable that a permeation flow rate of the supply-side separation membrane is measured, and a permeation flow rate of the concentration-side separation membrane is measured, so as to determine presence or absence of scale generation from a relationship between the two permeation flow rates. When a scale is generated, the decrease in the permeation flow rate of the concentration-side separation membrane will be conspicuous as compared with the supply-side separation membrane. Therefore, by measuring the permeation flow rates of the two membranes, the presence or absence of the scale generation can be easily determined from the relationship of the two.

On the other hand, a membrane separation apparatus of the present invention relates to a membrane separation apparatus equipped with a reverse osmosis membrane module for feeding a supply liquid and obtaining a permeated liquid and a concentrated liquid, characterized by including supply-side membrane separation means having a separation membrane whose membrane surface can be monitored and performing membrane separation by guiding the supply liquid, and concentration-side membrane separation means having a separation membrane whose membrane surface can be monitored and performing membrane separation by guiding the concentrated liquid.

According to the membrane separation apparatus of the present invention, not only the supply-side membrane separation means but also the concentration-side membrane separation means for performing membrane separation by guiding the concentrated liquid are provided, and these have membrane surfaces that can be monitored, so that the supply liquid can be evaluated, and the problems such as scale generated in the reverse osmosis membrane can be monitored in a more straightforward fashion. In other words, the evaluation of the supply liquid can be made by performing direct eye inspection for determination of mingling of foreign substances or the like with use of the supply-side separation membrane, and organic substances, inorganic substances, bacteria, and the like can be monitored by addition of a dyeing agent or the like. Also, as to the scale or the like, deposition onto the membrane surface of the concentration-side separation membrane can be directly monitored by eye inspection.

Because of the reason, it is preferable that the separation membrane of the concentration-side membrane separation means is a plain membrane having an average pore diameter of 1 μm or less, and a supply-side flow path of the plain membrane is made of a transparent material.

Also, because of the reason, it is preferable that the membrane separation apparatus further includes supply-side flow rate measuring means for measuring a permeation flow rate of the supply-side membrane separation means and concentration-side flow rate measuring means for measuring a permeation flow rate of the concentration-side membrane separation means.

Figure 1:
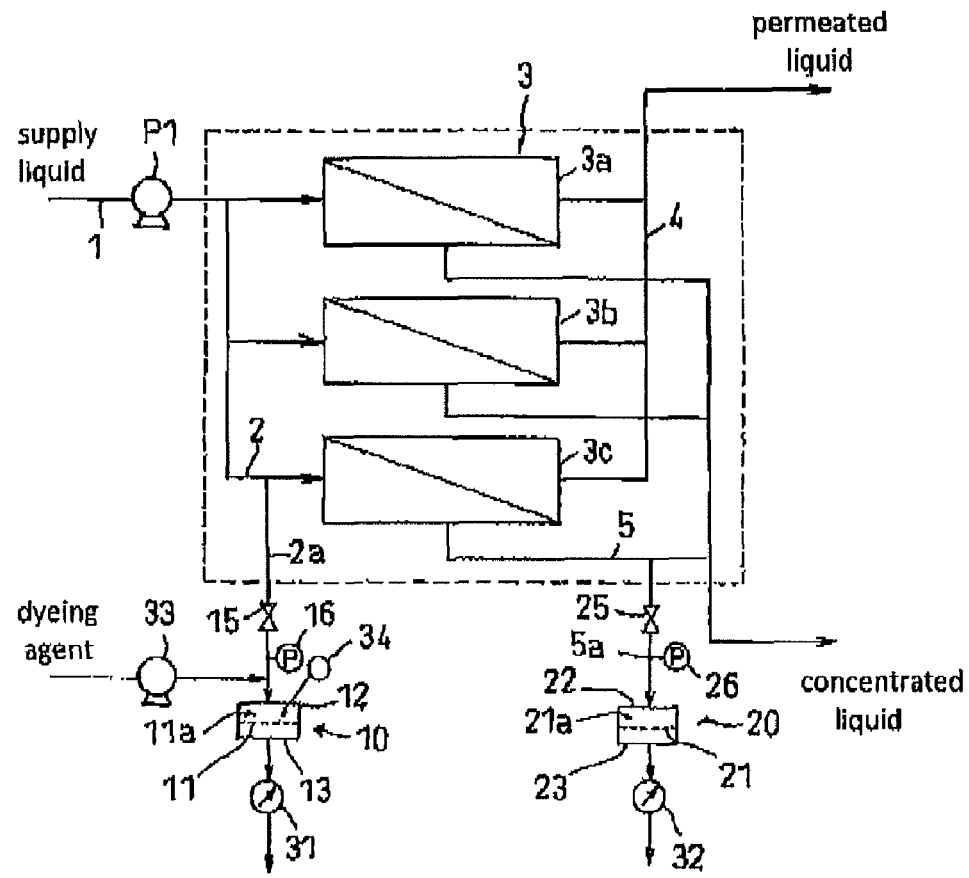
FIG. 1 is a schematic construction view illustrating one example of a membrane separation apparatus of the present invention.

DESCRIPTION OF THE SYMBOLS 3 a reverse osmosis membrane module
10 supply-side membrane separation means
11 a supply-side separation membrane
11a membrane surface
20 concentration-side membrane separation means
21 a concentration-side separation membrane
21a membrane surface
31 supply-side flow rate measuring means
32 concentration-side flow rate measuring means

BEST MODE FOR CARRYING OUT THE INVENTION

Hereafter, embodiments of the present invention will be described with reference to the drawings. FIG. 1 is a schematic construction view illustrating one example of a membrane separation apparatus of the present invention.

The membrane separation method of the present invention is a membrane separation method of feeding a supply liquid to a reverse osmosis membrane module and obtaining a permeated liquid and a concentrated liquid. Such a membrane separation method can be suitably carried out with use of a membrane separation apparatus of the present invention.

In other words, as illustrated in FIG. 1, the membrane separation apparatus of the present invention includes a reverse osmosis membrane module 3 for feeding a supply liquid and obtaining a permeated liquid and a concentrated liquid. In the present embodiment, an example is shown in which the reverse osmosis membrane module 3 is provided having three reverse osmosis membrane modules 3a to 3c connected in parallel.

As the reverse osmosis membrane module 3, any of spiral type, hollow thread type, tubular type, frame-and-plate type, and others is used; however, a spiral type using a spiral type separation membrane element in which a reverse osmosis membrane, supply-side flow path member, and a permeation side flow path member are wound around a porous central tube is preferable. As the reverse osmosis membrane module 3, those equipped with a single membrane element or plural membrane elements can be used. The plural membrane elements are typically connected in series, and the plurality of reverse osmosis membrane modules may be connected in series or in parallel.

The material constituting the reverse osmosis membrane used in the reverse osmosis membrane module 3 is not particularly limited, so that one can use, for example, various polymer materials such as cellulose acetate, polyvinyl alcohol, polyamide, and polyester.

As the membrane mode of the reverse osmosis membrane, there are a hollow thread, a plain membrane, a tubular membrane, and others. The plain membrane can be used by being incorporated into a spiral, frame-and-plate module, and the hollow thread can be used by incorporating plural bundles of threads into a module.

The feeding of the supply liquid is carried out, for example, by a pump P1, and the pressure of the supply liquid from a path 1 is raised to a predetermined operation pressure. The supply liquid having a raised pressure is fed to the reverse osmosis membrane module 3 via a path 2. In the reverse osmosis membrane module 3, reverse osmosis membrane separation is carried out, and a permeated liquid from which salts and others have been removed is taken out via a path 4, and a concentrated liquid having concentrated salts and others is taken out via a path 5.

The concentrated liquid from the reverse osmosis membrane module 3 may be released as an exhaust liquid; however, in order to enhance the collection ratio, the concentrated liquid can be partly circulated to the supply liquid side. The permeated liquid from the reverse osmosis membrane module 3 is fed to the reverse osmosis membrane module of the next stage or is used after being stored in a storage tank.

The membrane separation method of the present invention is characterized in that, in the membrane separation method such as described above, membrane separation is carried out by guiding the supply liquid to a supply-side separation membrane 11 whose membrane surface 11a can be monitored, and membrane separation is carried out by guiding the concentrated liquid to a concentration-side separation membrane 21 whose membrane surface 21a can be monitored.

Also, the membrane separation apparatus of the present invention is characterized by including supply-side membrane separation means 10 having a separation membrane 11 whose membrane surface 11a can be monitored and performing membrane separation by guiding the supply liquid, and concentration-side membrane separation means 20 having a separation membrane 21 whose membrane surface 21a can be monitored and performing membrane separation by guiding the concentrated liquid.

In the present embodiment, an example is shown in which supply-side flow rate measuring means 31 for measuring a permeation flow rate of the supply-side membrane separation means 10 and concentration-side flow rate measuring means 32 for measuring a permeation flow rate of the concentration-side membrane separation means 20 are further provided, whereby the presence or absence of scale generation is determined from the relationship of the two permeation flow rates.

It is sufficient that the supply-side membrane separation means 10 has a separation membrane 11 whose membrane surface 11a can be monitored. In the present invention, the term "can be monitored" means that the state around the membrane surface 11a can be observed or detected by eye inspection or with use of an analysis apparatus. For this reason, the separation membranes 11, 21 are not limited to plain membranes alone, but one can use a hollow thread membrane of external pressure type or a pleated plain membrane. However, a case of the plain membrane is preferable because the monitoring of the membrane surface 11a is facilitated.

The supply-side membrane separation means 10 is preferably such that a plain membrane can be set and the supply-side flow path is formed of a transparent material 12. For example, one can use a separation membrane cell of total quantity filtration type or a separation membrane cell of cross flow type in which a separation membrane 11 is incorporated and the stain on the membrane surface 11a can be observed (the same applies to the concentration-side membrane separation means 20). Also, one can use a separation membrane cell in which analysis can be made using a spectroscopic method, a method by image analysis, a method by trace amount sampling, or the like.

The transparent materials 12, 22 may be either non-colored transparent or colored transparent; however, a material having a large transmittance ratio to natural light or analysis light is preferable. The illustrated separation membrane cell of total quantity filtration type, for example, includes main body parts 13, 23 in which permeation-side flow paths of the separation membranes 11, 21 are formed, porous supporters that are innerly attached thereto and support the separation membranes 11, 21, and transparent materials 12, 22 that are fastened to the main body parts 13, 23 with bolts or the like via a sealing member. Here, when a separation membrane cell of total quantity filtration type is used, it provides an advantage in that the presence of foreign substances can be found and detected with certainty.

The supply liquid is guided to the supply-side membrane separation means 10 via a path 2a that is branched from the path 2 of the supply liquid. At this time, when the operation pressure of the supply-side membrane separation means 10 and the operation pressure of the reverse osmosis membrane module 3 are greatly different from each other, it is preferable to provide a pressure adjustment valve 15 and a pressure gauge 16 so as to adjust the operation pressure of the supply-side membrane separation means 10.

In the supply-side membrane separation means 10, foreign substances such as those flowing into, for example, litter or fine particles can be, as it is, separated on the membrane surface 11a by a precision filtration membrane having an average pore diameter of 1 μm or less, and this can be monitored by eye inspection. The monitoring can be made either by a method of performing it at all times or intermittently, or a method of monitoring only when abnormality occurs in the membrane separation apparatus.

In the present embodiment, an example is shown in which a dyeing agent is added to the path 2a of the supply liquid guided to the supply-side membrane separation means 10, and detection means 34 for detecting a dyed substance is provided. The dyeing agent is supplied, for example, from a storage tank of the dyeing agent by a pump 33. By addition of the dyeing agent, the monitoring of organic substances, inorganic substances, bacteria, and the like that causes a problem as a supplied liquid can be easily carried out by the detection means 34. The dyeing agent may be added either by a method of adding it at all times or intermittently, or a method of adding only when abnormality occurs.

The dyeing agent to organic substances may be, for example, toluidine blue, alcian blue (both from Wako Pure Chemical Industries, Ltd.), or the like. The organic substances can be separated on the membrane surface 11a by a precision filtration membrane, an ultrafiltration membrane, or a reverse osmosis membrane in accordance with the properties thereof, and this can be monitored by eye inspection or by analysis. However, by using the same separation membrane as the separation membrane used in the reverse osmosis membrane module 3, the situation of the membrane surface thereof can be reproduced, and can be monitored in a more straightforward fashion. As the detection method by analysis, determination and quantification of the organic substances can be carried out by measuring with use of a spectrocolorimeter or measuring the reflected light of the membrane surface with use of a spectrophotometer.

The dyeing agent to the problem-raising inorganic substances may be, for example, a dye or the like that shows an adsorption property to the inorganic substances. The problem-raising inorganic substances can be separated on the membrane surface 11a by a precision filtration membrane, an ultrafiltration membrane, or a reverse osmosis membrane in accordance with the properties thereof, and this can be monitored by eye inspection or by analysis. As the detection method by analysis, determination and quantification of the inorganic substances can be carried out by measuring with use of a spectrocolorimeter or measuring the reflected light of the membrane surface with use of a spectrophotometer.

The dyeing agent to the bacteria may be, for example, 2,3,5-triphenyltetrazolium chloride, adenosine triphosphate (fluorescent dyeing), or the like. The bacteria can be separated on the membrane surface 11a by a precision filtration membrane having an average pore diameter of 1 μm or less, and this can be monitored by eye inspection or by analysis. As the detection method by analysis, quantification of the bacteria can be carried out by measuring with use of a spectrocolorimeter or measuring the reflected light of the membrane surface with use of a spectrophotometer. Also, as to the bacteria, color generation or light emission can be made to occur by addition of an enzyme substrate or the like, and this can allow the bacteria kind to be specified.

In this manner, in the case of monitoring the supply liquid, the presence or absence of contamination and the suitableness degree of the supply liquid can be confirmed by monitoring at all times or periodically. Also, by monitoring in the case in which abnormality occurs in the reverse osmosis membrane module 3, the cause thereof can be investigated without disassembling the module, and a quick response (alkali cleaning to the organic substances and the bacteria) can be made.

On the other hand, the concentrated liquid is guided to the concentration-side membrane separation means 20 via a path 5a that is branched from the path 5 of the concentrated liquid. At this time, when the operation pressure of the concentration-side membrane separation means 20 and the operation pressure of the reverse osmosis membrane module 3 are greatly different from each other, it is preferable to provide a pressure adjustment valve 25 and a pressure gauge 26 so as to adjust the operation pressure of the concentration-side membrane separation means 20.

The concentration-side membrane separation means 20 may be any as long as it has a separation membrane 21 whose membrane surface 21a can be monitored, so that those similar to the supply-side membrane separation means 10 can be adopted. However, in performing the monitoring of scale efficiently, the separation membrane 21 of the concentration-side membrane separation means 20 is preferably a plain membrane (precision filtration membrane) having an average pore diameter of 1 µm or less.

A scale refers to inorganic salts that are deposited when mineral components or the like contained in the supply liquid are concentrated within the module to give a concentration larger than or equal to the solubility. The deposited inorganic salts grow to have a size of 1 µm or more and hence can be separated on the membrane surface 21a of the separation membrane 21, whereby the presence or absence of the scale can be determined by eye inspection. When the scale is generated, it is effective to perform acid cleaning.

In order to determine the presence or absence of the scale with more certainty, it is desirable that supply-side flow rate measuring means 31 for measuring a permeation flow rate of the supply-side membrane separation means 10 and concentration-side flow rate measuring means 32 for measuring a permeation flow rate of the concentration-side membrane separation means 20 are further provided, whereby the presence or absence of scale generation is determined from the relationship of the two permeation flow rates.

As the flow rate measuring means 31, 32, those of eye inspection type may be used; however, in the case of automatically determining the presence or absence of scale generation with use of an electric signal, those that can output a detection signal according to the flow rate are preferable. When scale is generated, the decrease in the permeation flow rate of the concentration-side separation membrane 21 will be conspicuous as compared with the supply-side separation membrane 11. Therefore, the presence or absence of scale generation can be determined, for example, by calculating and comparing the degree of change (differentiation value or the like) of the two permeation flow rates.

The membrane separation method and the membrane separation apparatus of the present invention described above can be suitably used for production of plain water by desalination of brine, seawater, or the like, production of ultrapure water or the like, waste liquid processing, contaminated water processing, other water processings, and the like. At that time, the supply liquid can be evaluated, and the problems of scale or the like that are generated in the reverse osmosis membrane can be monitored in a more straightforward fashion, so that the reverse osmosis membrane apparatus can be safely operated for a long period of time without inviting decrease in the permeation flux of the reverse osmosis membrane. Also, when the problems are actually raised, a quick and effective response can be made in accordance with the result of monitoring.

[Other Embodiments]

Figure 2:
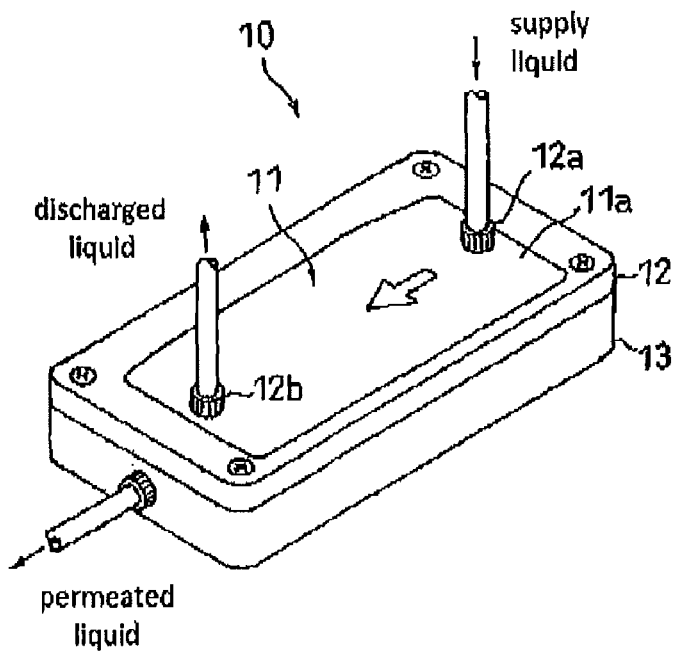
FIG. 2 is a perspective view illustrating another example of an essential part of the membrane separation apparatus of the present invention.

(1) In the above-described embodiment, an example has been shown in which separation membrane cells of total quantity filtration type are used as the supply-side membrane separation means and the concentration-side membrane separation means. However, in the present invention, a separation membrane cell of cross flow type such as shown in FIG. 2 can be used as at least one of the supply-side membrane separation means and the concentration-side membrane separation means. By using a separation membrane cell of cross flow type, clogging of the membrane surface can be prevented, and the supply liquid can be monitored for a long period of time.

In the example shown in FIG. 2, for example, a main body part 13 in which the permeation side flow path of the separation membrane 11 is formed, a porous supporter that is innerly attached thereto and supports the separation membrane 11, and a transparent material 12 that is fastened to the main body part 13 with a bolt or the like via a sealing member or the like are provided, and an introduction inlet 12a of the supply liquid is provided on the upstream side of the supply-side flow path formed with the transparent material 12, and a discharge outlet 12b of the supply liquid is provided on the downstream side of the supply-side flow path. Accordingly, the supply liquid flows in the direction of an arrow on the membrane surface 11a, whereby clogging or the like of the membrane surface can be effectively prevented, and the supply liquid can be monitored for a long period of time.

(2) In the above-described embodiment, an example has been shown in which the supply-side membrane separation means and the concentration-side membrane separation means are disposed at all times. However, in the present invention, the supply-side membrane separation means and/or the concentration-side membrane separation means can be disposed in an attachable and detachable manner in the membrane separation apparatus, and can be used by being removed at the time of analysis or the like. Also, a plurality of the supply-side membrane separation means and/or the concentration-side membrane separation means can be disposed, and any of those can be disposed in an attachable and detachable manner in the membrane separation apparatus, and can be used by being removed at the time of analysis or the like.

Also, the growth property of the bacteria can be tested by allowing the detected bacteria to grow with use of the supply-side membrane separation means that has been removed from the membrane separation apparatus.

(3) In the above-described embodiment, an example has been shown in which a precision filtration membrane or an ultrafiltration membrane is used as the supply-side membrane separation means and/or the concentration-side membrane separation means. In the present invention, a reverse osmosis membrane can be used as well. When a reverse osmosis membrane is used, by using a membrane identical to or similar to the separation membrane used in the reverse osmosis membrane module 3, the situation of the membrane surface can be reproduced and can be monitored in a more straightforward fashion. In that case, by performing the membrane separation with use of a separation membrane whose membrane surface can be monitored by the cross flow method, the membrane separation state within the module can be reproduced with a higher precision (that is, it can be made into a pseudo module). Also, by guiding the concentrated liquid and performing the membrane separation with use of a separation membrane whose membrane surface can be monitored by the cross flow method, the membrane separation state within the module can be evaluated in an acceleration test fashion. In particular, by the cross flow method, it will be advantageous for analysis of the adsorbed substances to the separation membrane.

(4) In the above-described embodiment, an example has been shown in which the permeated liquid after the separation by the supply-side membrane separation means is discharged to the outside of the system. However, in the present invention, the permeated liquid after the separation can be circulated to the upstream side of the pump P1. This can enhance the collection ratio in the membrane separation apparatus, (5) In the above-described embodiment, an example has been shown in which means for cleaning the reverse osmosis membrane is not provided. However, in the present invention, it is preferable to provide cleaning means for cleaning the reverse osmosis membrane based on the result of monitoring. Cleaning means for performing alkali cleaning is effective on the organic substances and bacteria, and cleaning means for performing acid cleaning is effective when the scale is generated. Besides this, one can provide reverse cleaning means for performing reverse flow cleaning.

The invention claimed is:

1. A membrane separation method with a membrane separation apparatus, comprising:
   (a) providing a supply liquid;
   (b) feeding a first part of the supply liquid to a reverse osmosis membrane module and a second part of the supply liquid to a supply-side monitoring membrane;
   (c) separating the first part of the supply liquid into a permeated liquid and a concentrated liquid with the reverse osmosis membrane module;
   (d) feeding a first part of the concentrated liquid away from the reverse osmosis membrane module;
   (e) feeding a second part of the concentrated liquid to a concentration-side monitoring membrane; and
   (f) comparing the result of monitoring a state of a substance on the supply-side monitoring membrane with the result of monitoring a state of a substance on the concentration-side monitoring membrane to carry out operation management of the reverse osmosis membrane.

2. The membrane separation method according to claim 1, wherein the substance is a bacteria, and wherein the method further comprises testing the growth property of bacteria.

3. The membrane separation method according to claim 1, further comprising cleaning the reverse osmosis membrane module with a cleaning solution, wherein the type of cleaning solution is selected based on the result of monitoring a state of a substance on the supply-side membrane and/or the concentration-side membrane.

4. The membrane separation method according to claim 1, further comprising adding a dyeing agent to a path of the second part of the supply liquid fed to the supply-side monitoring membrane.

5. The membrane separation method according to claim 1, further comprising adding a dyeing agent to a path of the second part of the concentrated liquid fed to the concentration-side monitoring membrane.

6. The membrane separation method according to claim 1, further comprising adjusting the pressure of the supply liquid fed to the supply-side monitoring membrane and/or the pressure of the concentrated liquid fed to the concentration-side monitoring membrane.

* * * * *